(12) United States Patent
Tamura

(10) Patent No.: US 7,421,473 B2
(45) Date of Patent: Sep. 2, 2008

(54) METHOD AND APPARATUS FOR IMAGE COMMUNICATIONS CAPABLE OF EFFECTIVELY PERFORMING RECEIPT ACKNOWLEDGEMENT

(75) Inventor: Hiroshi Tamura, Kanagawa-ken (JP)

(73) Assignee: Ricoh Company, Ltd., Tokyo (JP)

(*) Notice: Subject to any disclaimer, the term of this patent is extended or adjusted under 35 U.S.C. 154(b) by 1106 days.

(21) Appl. No.: 10/055,861

(22) Filed: Jan. 23, 2002

(65) Prior Publication Data
US 2002/0120700 A1    Aug. 29, 2002

(30) Foreign Application Priority Data
Jan. 24, 2001    (JP) .............. 2001-015278

(51) Int. Cl.
  G06F 15/16   (2006.01)
  H04L 9/00    (2006.01)
  B41B 1/00    (2006.01)
  H04N 1/00    (2006.01)
(52) U.S. Cl. ............. 709/206; 713/201; 358/1.9; 358/402
(58) Field of Classification Search ............. 713/201; 358/402, 1.9; 709/206
See application file for complete search history.

(56) References Cited

U.S. PATENT DOCUMENTS

| | | | |
|---|---|---|---|
| 5,701,497 | A | 12/1997 | Yamauchi et al. |
| 5,717,945 | A | 2/1998 | Tamura |
| 6,650,440 | B1 * | 11/2003 | Wing ............. 358/402 |
| 6,687,742 | B1 * | 2/2004 | Iwazaki ............. 709/206 |
| 2001/0005268 | A1 * | 6/2001 | Eguchi ............. 358/1.9 |
| 2002/0120700 | A1 | 8/2002 | Tamura |
| 2002/0144154 | A1 * | 10/2002 | Tomkow ............. 713/201 |

FOREIGN PATENT DOCUMENTS

| | | |
|---|---|---|
| JP | 5-236230 | 9/1993 |
| JP | 05236230 A * | 9/1993 |
| JP | 6-70117 | 3/1994 |
| JP | 9-153971 | 6/1997 |
| JP | 11-27414 | 1/1999 |
| JP | 2000-174973 | 6/2000 |
| JP | 2000-270185 | 9/2000 |
| JP | 3630532 | 12/2004 |

OTHER PUBLICATIONS

Provisional Application, U.S. Appl. No. 60/254,422, Kahin, Zafar, Registered Email, Dec. 6, 2000.*
English Translated Abstract for Foreign Patent Document, JP 05236230 A.*
U.S. Appl. No. 09/656,414, filed Sep. 6, 2000.
Jun. 26, 2007 Japanese official action (and English translation thereof) in connection with corresponding Japanese application No. 2001-015278.

* cited by examiner

*Primary Examiner*—Bunjob Jaroenchonwanit
*Assistant Examiner*—Philip C Lee
(74) *Attorney, Agent, or Firm*—Cooper & Dunham, LLP

(57) ABSTRACT

A novel method of image communications with E-mail includes the steps of receiving, decoding, creating, attaching, and transmitting. The receiving step receives from a mail sender E-mail containing image information and including a request for a receipt acknowledgement. The decoding step decodes the image information contained in the E-mail. The creating step creates a return mail for acknowledging a receipt of the electronic mail. The attaching step attaches a predetermined page of the image information to the return mail. The transmitting step transmits the return mail back to the mail sender as a response to the request.

68 Claims, 8 Drawing Sheets

FIG. 3

```
Date: Tue. 16 Feb 2000 13:41:13 +0900
From: receiver@omega.mie.hor.co.jp
Message-ID: <36C8F6E9.39C6DC2F@mie.hor.co.jp>
Subject: Return Receipt
To: tamura@maple.kei.co.jp
References: <20000216134143N.tamura@maple.kei.co.jp>
MIME-Version: 1.0
Content-Type: multipart/report; report-type=disposition-notification
        boundary="———— mdn97D5884EAE879BD0C9F642A9"

———————— mdn97D5884EAE879BD0C9F642A9
Content-Type: text/plain; charset=us-ascii

This is a Return Receipt for the mail that you sent to
receiver@omega.mie.hor.co.jp.

The 1st page is attached.

———————— mdn97D5884EAE879BD0C9F642A9
Content-Type: message/disposition-notification Reporting-UA: omega.mie.hor.co.jp;
Final-Recipient: rfc822; receiver@omega.mie.hor.co.jp
Original-Massage-ID: <20000216134143N. tamura@maple.kei.co.jp>
Disposition: manual-action/MDN-sent-manually; displayed
X-attached-parts: 1st page ———————— mdn97D5884EAE879BD0C9F642A9
Content-Type: message/rfc822

( Message )

———————— mdn97D5884EAE879BD0C9F642A9——
```

- 20a: Date … boundary line
- 20b: text/plain part
- 20c: disposition-notification part
- 20d: message/rfc822 part

21a
Date: Tue. 16 Feb 2000 13:41:13 +0900
From: receiver@omega.mie.hor.co.jp
Massage-ID: <36C8F6E9.39C6DC2F@mie.hor.co.jp>
Subject: Return Receipt
To: tamura@maple.kei.co.jp
References: <20000216134143N. tamura@maple.kei.co.jp>
MIME-Version: 1.0
Content-Type: multipart/report; report-type=disposition-notification
       boundary="———— mdn97D5884EAE879BD0C9F642A9"

———————— mdn97D5884EAE879BD0C9F642A9
Content-Type: text/plain; charset=us-ascii

21b
This is a Return Receipt for the mail that you sent to
receiver@omega.mie.hor.co.jp. A decoding error occurred
in the attached file.

The whole message is attached.

———————— mdn97D5884EAE879BD0C9F642A9
Content-Type: message/disposition-notification;

21c
Reporting-UA: omega.mie.hor.co.jp;
Final-Recipient: rfc822; receiver@omega.mie.hor.co.jp
Original-Message-ID: <20000216134143N. tamura@maple.kei.co.jp>
Disposition: manual-action/MDN-sent-manually; <u>processed/error</u>
X-attached-parts: whole message ———————— mdn97D5884EAE879BD0C9F642A9
Content-Type: message/rfc822

21d
(Message)

———————— mdn97D5884EAE879BD0C9F642A9—

FIG. 5

```
Date: Tue. 16 Feb 2000 13:23:20 +0900 (JST)
From: Mail Delivery Subsystem <MAILER-DAEMON@jupiter.mie.
      hor.co.jp>
Subject: Return receipt
Message-Id: <200002160423.NAA01411@jupiter.mie.hor.co.jp>
To: tamura@maple.kei.co.jp
MIME-Version: 1.0
Content-Type: multipart/report; report-type=delivery-status;
        boundary="NAA01411.919139000/jupiter.mie.hor.co.jp"
Auto-Submitted: auto-generated (return-receipt)
```
(22a)

```
-NAA01411.919139000/jupiter.mie.hor.co.jp
Content-type: text/plain; charset=us-ascii The original message was received at Tue, 16 Feb 2000 13:20:56
+0900 (JST) from maple.kei.co.jp.

—The following addresses had successful delivery notifications--
receiver@jupiter.mie.hor.co.jp (successfully delivered to mailbox)

The 1st page is attached.
```
(22b)

```
-NAA01411.919139000/jupiter.mie.hor.co.jp
Content-Type: message/delivery-status Original-Envelope-Id: NM123456
Reporting-MTA: dns; jupiter.mie.hor.co.jp
Received-From-MTA: DNS; jupiter.mie.hor.co.jp
Arrival-Date: Tue. 16 Feb 2000 13:22:39 +0900 (JST)

Final-Recipient: RFG822: receiver@jupiter
Action: delivered
Status: 2.0.0
X-attached-parts: 1st page
```
(22c)

```
-NAA01411.919139000/jupiter.mie.hor.co.jp
Content-Type: message/rfc822

(Message)

-NAA01411.919139000/jupiter.mie.hor.co.jp—
```
(22d)

23a
Date: Tue. 16 Feb 2000 13:23:20 +0900 (JST)
From: Mail Delivery Subsystem <MAILER-DAEMON@jupiter.mie.hor.co.jp>
Subject: Return receipt
Message-Id: <200002160423.NAA01411@jupiter.mie.hor.co.jp>
To: tamura@maple.kei.co.jp
MIME-Version: 1.0
Content-Type: multipart/report; report-type=delivery-status;
          boundary="NAA01411.919139000/jupiter.mie.hor.co.jp"
Auto-Submitted: auto-generated (failure)

-NAA01411.919139000/jupiter.mie.hor.co.jp
Content-type: text/plain; charset=us-ascii

23b
The original message was received at Tue. 16 Feb 2000 13:20:56 +0900 (JST) from maple.kei.co.jp.

—The following addresses had fatal errors—
receiver@jupiter.mie.hor.co.jp (unsuccessfully received)

The whole message is attached.

-NAA01411.919139000/jupiter.mie.hor.co.jp
Content-Type: message/delivery-status

Original-Envelope-Id: NM123456
Reporting-MTA: dns; jupiter.mie.hor.co.jp
Received-From-MTA: DNS; jupiter.mie.hor.co.jp
Arrival-Date: Tue. 16 Feb 2000 13:22:39 +0900 (JST)

23c
Final-Recipient: RFC822; receiver@jupiter
Action: <u>failed</u>
Status: 5.6.1
Diagnostic-Code: smtp; 554 5.6.1 Decode error
X-attached-parts: whole message -NAA01411.919139000/jupiter.mie.hor.co.jp
Content-Type: message/rfc822

23d
(Message)

-NAA01411.919139000/jupiter.mie.hor.co.jp--

METHOD AND APPARATUS FOR IMAGE COMMUNICATIONS CAPABLE OF EFFECTIVELY PERFORMING RECEIPT ACKNOWLEDGEMENT

BACKGROUND

1. Field

This patent specification relates to a method and apparatus for image communications, and more particularly to a method and apparatus for image communications capable of effectively performing a receipt acknowledgement.

2. Description of Related Art

Conventionally, facsimile communications are performed through communications networks including a PSTN (public switched telephone network) and an ISDN (integrated services digital network). However, as the Internet is coming into wide use in recent years, it becomes possible for facsimile communications to use the Internet. The facsimile communications using the Internet is referred to as an Internet-facsimile. The Internet-facsimile is an attempt to provide a facsimile transmission at a lower communications charge.

Since a method of transmitting image data using E-mail is standardized as a store-and-forward Internet-facsimile (abbreviated as an S&F Internet-Fax) according to RFC2305/2532 and T.37, the number of communications apparatuses supporting this method has grown recently. The above-mentioned term RFC stands for a request for comments and is published by the IETF (Internet engineering task force) which is an expert group for Internet engineering. The above-mentioned term T.37 is a name of a work group belonging to the CCITT (the International Telegraph and Telephone Consultative Committee).

The above-mentioned method for image communications provides a receipt acknowledgement feature in which a sender can request that a receiver send back a receipt acknowledgement. If the receiver supports this receipt acknowledgement feature, the receiver generates and returns an acknowledgement mail to the sender upon receipt of the request.

However, this method for image communications has a drawback, that is, it may be difficult for the sender to identify each receipt acknowledgement against the number of mails the sender has sent. This is because the sender cannot receive receipt acknowledgement as a real-time response from the receiver since each receipt acknowledgement from the receiver reaches the sender after a delay.

SUMMARY

This patent specification describes a novel method of image communications with E-mail. In one example, this novel method includes the steps of receiving, decoding, creating, attaching, and transmitting. The receiving step receives E-mail that contains image information and includes a request for a receipt acknowledgement. The above-mentioned E-mail is sent from a mail sender. The decoding step decodes the image information contained in the E-mail. The creating step creates a return mail for acknowledging a receipt of the electronic mail. The attaching step attaches a predetermined page of the image information to the return mail. The transmitting step transmits the return mail back to the mail sender as a response to the request.

The above-mentioned predetermined page may be a first page of the image information contained in the received E-mail.

The above-mentioned attaching step may attach the E-mail as it is to the return mail when the decoding step cannot decode the image information.

The above-mentioned request included in the E-mail may request an MDN, the receiving step may receive the E-mail according to a POP3 or an IMAP4 procedure, and the transmitting step may transmit the return mail according to an SMTP procedure.

The above-mentioned request included in the E-mail may request a DSN, the receiving step may receive the E-mail according to an SMTP procedure, and the transmitting step may transmit the return mail according to the SMTP procedure.

The above-mentioned method may further include a step of embedding a number of the predetermined page into a first part of the return mail.

The above-mentioned method may further include a step of embedding a number of the predetermined page into a second part of the return mail.

The above-mentioned predetermined page of the image information attached to the return mail may correspond to a number of a page designated by the request included in the E-mail.

The above-mentioned predetermined page of the image information attached to the return mail may correspond to a number of a page designated by the mail sender through a procedure of an SMTP for the E-mail.

This patent specification describes another novel method of image communications with E-mail. In one example, this novel method includes the steps of transmitting, receiving, and outputting. The transmitting step transmits to a mail recipient E-mail that contains image information and includes a request for a receipt acknowledgement. The receiving step receives a return mail from the mail recipient for acknowledging a receipt of the E-mail. The above-mentioned return mail includes a predetermined page of the image information contained in the E-mail. The outputting step outputs a status report indicating contents of the return mail and an image of the predetermined page included in the image information.

The above-mentioned predetermined page may be a first page of the image information contained in the E-mail.

The above-mentioned return mail received by the receiving step may include the image information included in the E-mail without being decoded when the image information cannot be decoded by the mail recipient.

The above-mentioned request included in the E-mail may request an MDN, the transmitting step may transmit the E-mail according to an SMTP procedure, and the receiving step may receive the return mail according to a POP3 or an IMAP4 procedure.

The above-mentioned request included in the E-mail may request a DSN, the transmitting step may transmit the E-mail according to an SMTP procedure, and the receiving step may receive the return mail according to an SMTP procedure.

In the above-mentioned method, a first part of the return mail received by the receiving step may be embedded with a number of the predetermined page attached to the return mail.

In the above-mentioned method, a second part of the return mail received by the receiving step may be embedded with a number of the predetermined page attached to the return mail.

The above-mentioned E-mail may include page information designating a number of a page to be attached to the return mail, and the predetermined page of the image information attached to the return mail may accordingly correspond to the page information.

The above-mentioned method may further include a step for designating a number of a page to be attached to the return mail through an SMTP procedure for the E-mail. In this case, the predetermined page of the image information attached to the return mail may accordingly correspond to the number of the page designated by the designating step.

This patent specification further describes a novel data terminal coupled to at least a local area network. In one example, a novel data terminal coupled to at least a local area network includes a communications mechanism, a decoder, and a controller. The communications mechanism is arranged and configured to receive E-mail that contains image information and includes a request for a receipt acknowledgement. The above-mentioned E-mail is sent from a mail sender through the local area network. The decoder decodes the image information contained in the E-mail. The controller is arranged and configured to create a return mail for acknowledging a receipt of the electronic mail, to attach a predetermined page of the image information to the return mail, and to cause the communications mechanism to transmit the return mail back to the mail sender as a response to the request.

This patent specification describes another novel data terminal coupled to a local area network. In one example, this novel data terminal includes a communications mechanism, an outputting mechanism, and a controller. The communications mechanism is arranged and configured to transmit E-mail to a mail recipient and to receive a return mail from the mail recipient for acknowledging a receipt of the E-mail. The above-mentioned E-mail contains image information and includes a request for a receipt acknowledgement, and the above-mentioned return mail includes a predetermined page of the image information contained in the E-mail. The outputting mechanism is arranged and configured to output information. The controller is arranged and configured to create the E-mail. The controller is further arranged and configured to retrieve the predetermined page and to cause the outputting mechanism to output a status report indicating contents of the return mail and an image of the retrieved predetermined page when the communications mechanism receives the return mail.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 is an exemplary return mail using an MDN for a receipt acknowledgement;

FIG. 4 is another exemplary return mail using an MDN for a receipt acknowledgement;

FIG. 5 is an exemplary return mail using a DSN for a receipt acknowledgement;

FIG. 6 is another exemplary return mail using a DSN for a receipt acknowledgement;

DETAILED DESCRIPTION OF PREFERRED EMBODIMENTS

Figure 1:
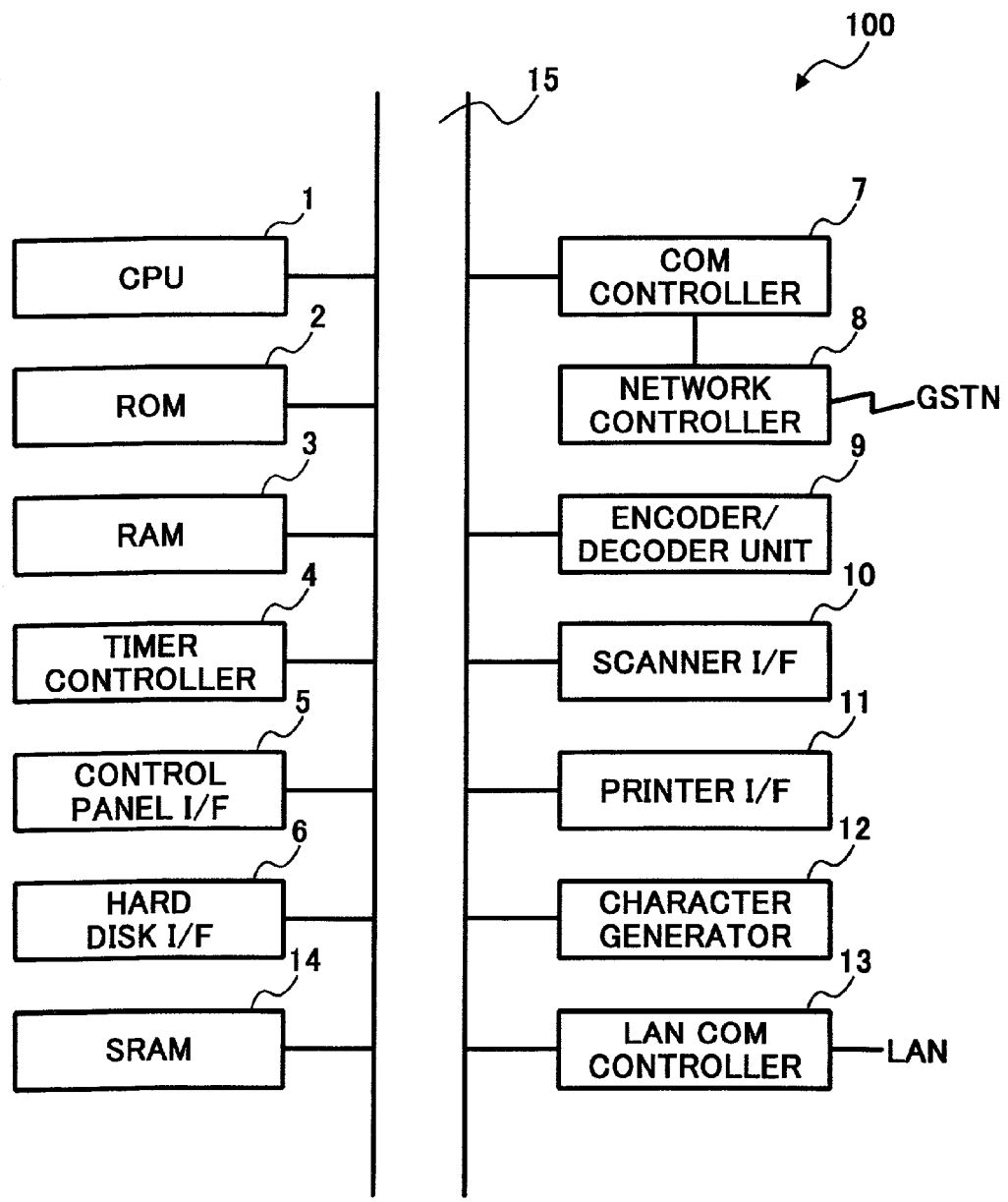
FIG. 1 is a schematic block diagram of a data terminal according to a preferred embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, and more particularly to FIG. 1 thereof, an exemplary internal structure of a data terminal 100 according to a preferred embodiment is illustrated. The data terminal 100 of FIG. 1 includes a CPU (central processing unit) 1, a ROM (read only memory) 2, a RAM (random access memory) 3, a timer controller 4, a control panel I/F (interface) 5, a hard disk I/F (interface) 6, a com (communications) controller 7, and a network controller 8. The CPU 1 controls the entire operations of the data terminal 100 using programs including an operating system program mainly stored in the ROM 2 and various application programs mainly stored in the RAM 3. The timer controller 4 counts clock pulses and generates time information signals. The control panel I/F 5 interfaces between the CPU 1 and a control panel (not shown) which includes keys and indicators for an operator to manipulate the data terminal 100. The hard disk I/F 6 interfaces between the CPU 1 and a hard disk (not shown) which is a large capacity data storage. The com controller 7 controls facsimile communications. The network controller 8 is connected to a GSTN (general switched telephone network) and controls electric interfacing with the GSTN.

The data terminal 100 further includes an encoder/decoder unit 9, a scanner I/F (interface) 10, a printer I/F (interface) 11, a character generator 12, a LAN (local area network) com (communications) controller 13, SRAM (static random access memory) 14, and an internal bus 15. The encoder/decoder unit 9 compresses and decompresses image information. The scanner I/F 10 interfaces between the CPU 1 and a scanner (not shown) for scanning document to read images. The printer I/F 11 interfaces between the CPU 1 and a printer (not shown) for reproducing image information. The character generator 12 stores information of character fonts. The LAN com controller 13 is connected to a LAN (local area network) which may be connected to the Internet and controls communications with the LAN. The SRAM 14 holds data when the data terminal 100 is not electrically powered. The internal bus 15 connects the above-mentioned components included in the data terminal 100, to each other.

In the above-described data terminal 100, the LAN com controller 13 serves as a physical layer compatible with Ethernet which is a local area network hardware, communications, and cabling standard. The LAN com controller 13 controls LAN protocols including SMTP (simple mail transfer protocol), POP3 (post office protocol version 3), IMAP4 (acronym for Internet message access protocol version 4), TCP (transmission control protocol), UDP (user datagram protocol), IP (Internet protocol), etc., in collaboration with the CPU 1 as well as the ROM 2 and RAM 3 storing the programs and data according to the preferred embodiment.

Figure 2:
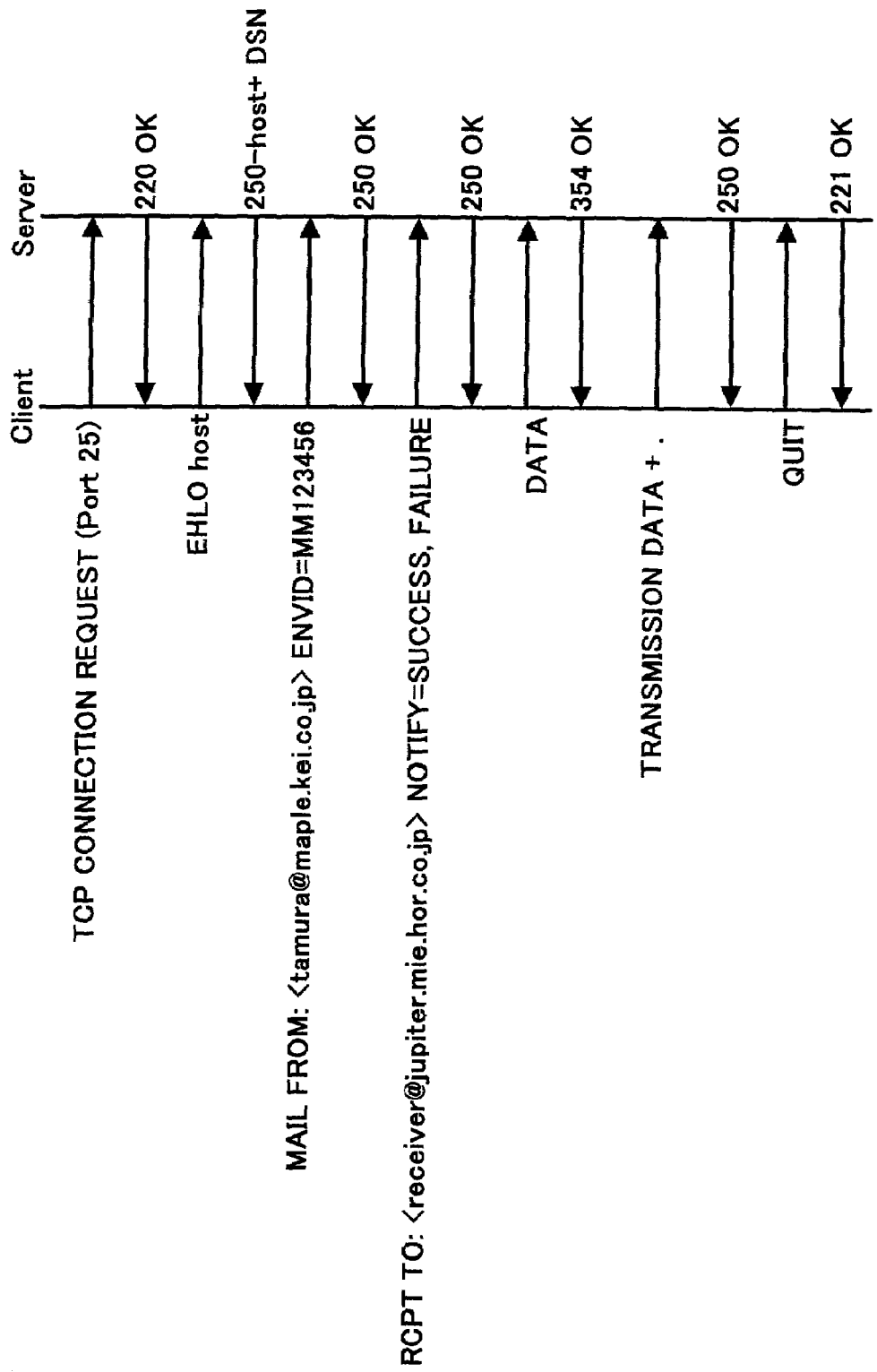
FIG. 2 is a schematic diagram for explaining an exemplary basic SMTP sequence performed between a client and a server.

To transmit document including image information over the Internet, the above-structured data terminal 100 uses a mail transfer protocol SMTP. FIG. 2 shows an example of an SMTP communications sequence performed between a client (i.e., the data terminal 100) and a server.

When the data terminal 100 is not required to perform facsimile communications through the GSTN, it can have a configuration excluding the com controller 7 and the network controller 8.

The Internet provides methods for notification such as an MDN (message disposition notification) defined by RFC2298 and a DSN (delivery status notification) defined by RFC1891 and RFC1894. In the MDN the first part of the mail serves as a user readable part, and in the DSN the second part of the mail serves as a machine readable part.

The data terminal 100 at the mail sender site is configured to add a "Disposition" filed having terms such as "Disposition-Notification-To:tamura@maple.kei.co.jp," for example, in a mail header of E-mail to request a mail receipt acknowledgement from a mail recipient when using the above-mentioned MDN, for example. The data terminal transmits such E-mail to the mail recipient according to an SMTP procedure, for example.

The data terminal 100 at the mail recipient site receives the above-mentioned mail requesting a mail receipt acknowledgement according to a POP3 procedure or IMAP4 procedure, for example. The data terminal at the mail recipient site is configured to send, as a response to an MDN mail receipt acknowledgement request, a return mail having a receipt acknowledgement message to an address designated in the mail header of mail requesting the MDN mail receipt acknowledgement.

Thus, the request and the response of the MDN mail receipt acknowledgement can be achieved between the data terminals 100 at the mail sender and mail recipient sites.

FIG. 3 shows exemplary contents of an MDN return mail 20 sent by the data terminal 100. The MDN return mail 20 of FIG. 3 includes a header 20a, a first part 20b, a second part 20c, and a third part 20d. The second part 20c includes the "Disposition" field having terms such as "Disposition: manual-action/MDN-sent-manually; displayed," for example, which acknowledges a safe receipt of the mail by the mail recipient, the data terminal 100. The term "displayed" included in the above-mentioned phrase may be replaced with a term "dispatched."

In the MDN return mail 20, the first part 20b serves as a user readable part and the second part 20c serves as a machine readable part, as described above. As shown in FIG. 3, the first part 20b includes an exemplary message stating that the first page is attached. This indicates the MDN return mail 20 contains the first page of the received image information and does not contain the remainder, in the third part 20d. In the third part 20d, a parenthesized word "Message" indicates an existence of such attachment. Also, the second part 20c includes an "X" field, named as an "X-attached-parts" field, stating that the first page is attached. This also indicates the MDN return mail 20 contains the first page of the received image information and does not contain the remainder, in the third part 20d. The above-mentioned first page indicated in the first part 20b and the second part 20c is merely one example. As an alternative to it, any page and any number of pages within the whole received image information may selectively be attached and indicated accordingly.

Although in this case the above-mentioned "X" field is used since the "X" field is a flexible field and is freely usable, it is possible that the Internet assigned numbers authority (IANA) may define a specific field for the above-mentioned purpose instead of the "X" filed. In addition, the name given here to the "X" field is one example and other names may be given thereto.

When the data terminal 100 at the mail sender site receives the above-described MDN return mail 20 from the mail recipient, the data terminal 100 at the mail sender site automatically outputs a status report indicating a successful receipt with a reproduction of the first page to allow an operator of the mail sender site to see the image of the first page. Thus, the operator of the mail sender site can recognize the successful receipt of the mail at the mail recipient site and can identify the mail by seeing the attached first page. In this way, it becomes possible for the mail sender to identify each return mail for receipt acknowledgement even if the return mails are returned at random, not in an order the sender has sent the mails.

When an error occurs at the data terminal 100 at the mail recipient site in receiving the mail sent from the mail sender and the recipient site cannot decode the received image information, it may be difficult for the recipient site data terminal 100 to pick up the first page of the received image information attached to the received mail to attach it to the MDN return mail for the mail receipt acknowledgment. In such a case, the data terminal 100 sends an MDN return mail 21 shown in FIG. 4 with the whole received image information as it is without applying the decoding process. FIG. 4 shows exemplary contents of the MDN return mail 21 when the above-described failure occurs at the data terminal at the mail recipient site. The MDN return mail 21 of FIG. 4 includes a header 21a, a first part 21b, a second part 21c, and a third part 21d. As shown in FIG. 4, the second part 21c includes the "Disposition" field having terms such as "Disposition:manual-action/MDN-sentmanually;processed/error." This "Disposition" field indicates that the mail recipient has failed in receiving the mail sent from the mail sender. Further, the first part 21b includes a message stating that the whole message is attached. This indicates that the MDN return mail 21 contains the whole received image information in the third part 21d. In the third part 21d, a parenthesized word "Message" indicates the existence of such attachment. Also, the second part 21c includes an "X-attached-parts" field stating that the whole message is attached. This also indicates that the MDN return mail 21 includes the whole received image information in the third part 21d.

When the data terminal 100 at the mail sender site receives the above-described MDN return mail 21 from the mail recipient, the data terminal 100 at the mail sender site automatically outputs a status report indicating a failed receipt with a reproduction of the first page of the received image information to allow an operator of the mail sender site to see the image of the first page. Thus, the operator of the mail sender site can recognize the failed receipt of the mail including the image information at the mail recipient site and can identify the mail by seeing the first page of the received image information. In this way, it becomes possible for the mail sender not only to receive a receipt acknowledgement but also to identify each return mail for receipt acknowledgement for both successful and failed mail receiving even if the return mails are sent at random, not in an order the sender has sent the mails.

In this way, the data terminals 100 at the mail sender and recipient sites can effectively achieve communication of mail receipt acknowledgement using the MDN of the Internet, wherein the mail sender can identify each return mail from the image information attached to the return mail.

The data terminal 100 can perform the communication of the mail receipt acknowledgement request and the response using the DSN, which are executed on an SMTP command level. That is, the data terminal at the mail sender site transmits E-mail according to an SMPT procedure and the data terminal at the mail recipient site receives the E-mail also according to an SMPT procedure. As shown in the exemplary SMTP communications sequence of FIG. 2, the client sends an EHLO command and the server sends back a 250-DSN signal as a response to the EHLO command. This indicates that the server supports the DSN. The data terminal 100 can send a DSN mail receipt acknowledgement request using, for example, a recipient designating command having terms such as;

RCPT: <receiver@jupiter.mie.hor.co.jp>NOTIFY=SUCCESS, or
RCPT: <receiver@jupiter.mie.hor.co.jp>NOTIFY=FAILURE, for example, wherein the former requests the DSN mail receipt acknowledgement to be returned when the mail recipient successfully receives the mail and the latter requests it to be returned when the mail recipient fails in receiving the mail. It is also possible to request the DSN mail receipt acknowledgement to be returned both when the mail recipient successfully receives the mail and when the mail recipient fails in receiving the mail, with the recipient designating command having the terms in a way such as;

RCPT: <receiver@jupiter.mie.hor.co.jp>NOTIFY=SUCCESS, FAILURE, for example.

As a response to the above-mentioned DSN mail receipt acknowledgement request, the mail recipient sends a DSN return mail 22 shown in FIG. 5 for the mail receipt acknowledgement to the mail sender using an address designated in a "MAIL FROM" field of the mail sent from the mail sender.

FIG. 5 shows exemplary contents of the DSN return mail 22 for the mail receipt acknowledgement when the mail recipient successfully receives the mail. The DSN return mail 22 of FIG. 5 includes a header 22a, a first part 22b, a second part 22c, and a third part 22d. In the DSN return mail 22, the first part 22b serves as a user readable part and the second part 22c serves as a machine readable part, as described above. As shown in FIG. 5, the DSN return mail 22 has a term "delivered" in an "Action" field in the second part 22c. This indicates a status that the mail recipient has successfully received the mail sent from the mail sender. In FIG. 5, the first part 22b includes a message stating that the first page is attached. This indicates the DSN return mail 22 contains the first page of the received image information and does not contain the remainder, in the third part 22d. In the third part 22d, a parenthesized word "Message" indicates an existence of such attachment. Also, the second part 22c includes an "X-attached-parts" field stating that the first page is attached. This also indicates the DSN return mail 22 contains the first page of the received image information and does not contain the remainder, in the third part 22d. The above-mentioned first page indicated in the first part 22b and the second part 22c is an example. As an alternative to it, any page and any number of pages within the whole received image information may selectively be attached and indicated accordingly.

When the data terminal 100 at the mail sender site receives the above-described DSN return mail 22 from the mail recipient, the data terminal 100 at the mail sender site automatically outputs a status report indicating a successful receipt with a reproduction of the first page to allow an operator of the mail sender site to see the image of the first page. Thus, the operator of the mail sender site can recognize the successful receipt of the mail at the mail recipient site and can identify the mail by seeing the attached first page. In this way, it becomes possible for the mail sender to identify each return mail for receipt acknowledgement even if the return mails are returned at random, not in an order the sender has sent the mails.

FIG. 6 shows exemplary contents of a DSN return mail 23 for the mail receipt acknowledgement when an error occurs at the mail recipient in receiving the mail. The DSN return mail 23 of FIG. 6 includes a header 23a, a first part 23b, a second part 23c, and a third part 23d. As shown in FIG. 6, the DSN return mail 23 has a term "failed" in an "Action" field in the second part 23c. This indicates that the mail recipient has failed in receiving the mail sent from the mail sender. The first part 23b includes a message stating that the whole message is attached. This indicates the DSN return mail 23 contains an attachment of the whole received image information in the third part 23d. In the third part 23d, a parenthesized word "Message" indicates an existence of such attachment. Also, the second part 23c includes an "X-attached-parts" field stating that the whole received image information is attached. This also indicates the DSN return mail 23 contains the whole received image information in the third part 23d.

When the data terminal 100 at the mail sender site receives the above-described DSN return mail 23 from the mail recipient, the data terminal 100 at the mail sender site automatically outputs a status report indicating a failed receipt with a reproduction of the first page of the received image information to allow an operator of the mail sender site to see the image of the first page. Thus, the operator of the mail sender site can recognize the failed receipt of the mail at the mail recipient site and can identify the mail by seeing the first page of the attached image information. In this way, it becomes possible for the mail sender not only to receive a receipt acknowledgement but also to identify each return mail for receipt acknowledgement for both successful and failed mail receiving even though the return mails will be sent at random, not in an order the sender has sent the mails.

In this way, the data terminals 100 at the mail sender and recipient sites can effectively achieve the communications of the mail receipt acknowledgement using the DSN of the Internet, wherein the mail sender can identify each return mail from the image information attached to the return mail.

When the data terminal 100 sends mail including image information with a request of the mail receipt acknowledgement using the MDN or the DSN, the sender may have a desire for specific pages within the image information to be returned with a mail receipt acknowledgement. In such a case, the data terminal 100 can designate the specific page or pages desired in a header of the sending mail. For example, when the first page is desired to be returned, the data terminal 100 provides an "X" field arranged as "X-request-for-notification: 1st page returned" in the header of the sending mail. In place of the first page, any specific pages or parameters other than pages may be used.

The "X" field is convenient and flexible as such, but it is possible that the Internet assigned numbers authority (IANA) may define a specific field for the above-mentioned purpose instead of the "X" filed. In addition, the name given here to the "X" field is one example and other names may be given thereto.

The data terminal 100 is also capable of designating the specific pages desired using commands during the SMTP communications. For example, when the first page is desired, a "MAIL FROM" field in the SMTP communications is arranged to have terms such as;

"MAIL FROM: <tamura@maple.kei.co.jp>NOTIFY=SUCCESS RET=1ST." It should be noted that the term "1ST" is not a standard term and therefore this method can be usable after the term "1ST" becomes a standard term.

However, as a non-standard method, the term "RET=1ST" may be used as an option term to the "MAIL FROM" command after the mail sender and the mail recipient each recognize that each counter part supports non-standard functions through the SMTP communications in which the mail sender sends the "EHLO" command, for example, and the mail recipient sends back a response signal such as "250-RICOHNONSTANDARD," for example.

Figure 7:
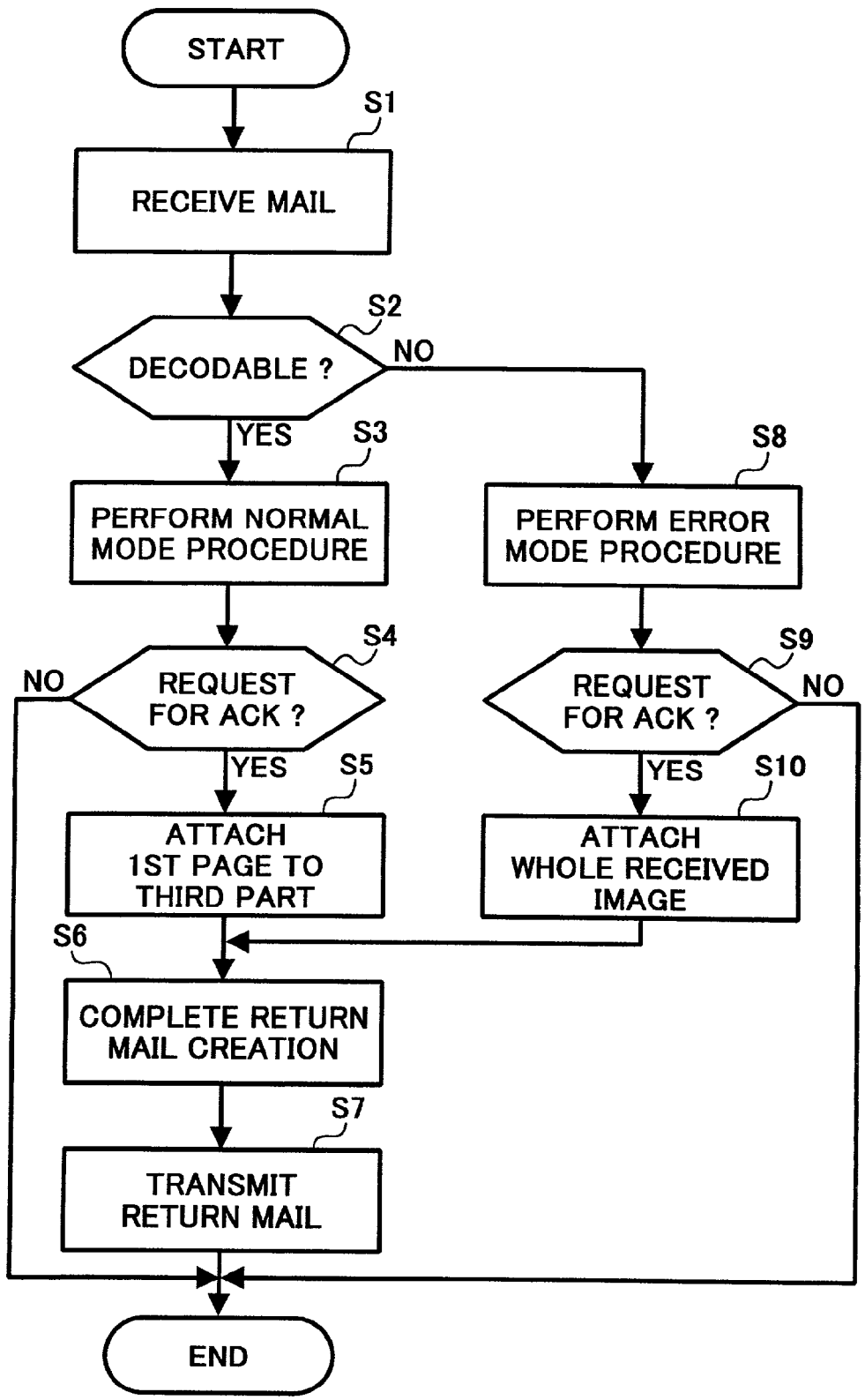
FIG. 7 is a flowchart for explaining an exemplary procedure of an E-mail receiving operation performed by the data terminal of FIG. 1 located at a receiver site.

Referring to FIG. 7, an exemplary procedure of a mail receiving operation performed by the data terminal 100 at the mail recipient site is explained. The mail sent from the data terminal 100 at the mail sender site includes image information, as discussed so far in the above description. In Step S1 of FIG. 7, the data terminal 100 at the mail recipient site receives mail including image information. The CPU 1 of the data terminal 100 at the mail recipient site examines if the received image information can be decoded, in Step S2. If the received image information is decodable and the examination result of Step S2 is YES, the process proceeds to Step S3. In Step S3, the CPU 1 performs predetermined operations for a normal receiving mode, such as an image reproduction on a recording sheet, displaying statuses and operator guidance, updating data of communications information, etc. After that, in Step S4, the CPU 1 checks if the received mail includes a mail receipt acknowledgement request using the MDN or the DSN. If the received mail includes a mail receipt acknowledgement request using the MDN or the DSN and the check result of Step S4 is YES, the process proceeds to Step S5. In Step S5, the CPU 1 creates an MDN or DSN return mail for the mail receipt acknowledgement and attaches the first page, or designated pages, of the received image information to the third part 20d (FIG. 3) or the third part 22d (FIG. 5), respectively. Then, the CPU 1 completes the creation of the MDN or DSN return mail in Step S6 and sends it to the mail sender in Step S7. The process then ends. If the received mail does not include a mail receipt acknowledgement request using the MDN or the DSN and the check result of Step S4 is NO, the process ends.

If the received image information is not decodable and the examination result of Step S2 is NO, the process proceeds to Step S8. In Step S8, the CPU 1 performs predetermined operations for a failed receiving mode, such as producing an error report on a recording sheet, displaying error statuses and operator guidance, updating data of communications information, etc. After that, in Step S9, the CPU 1 checks if the received mail includes a mail receipt acknowledgement request using the MDN or the DSN. If the received mail includes a mail receipt acknowledgement request using the MDN or the DSN and the check result of Step S9 is YES, the process proceeds to Step S10. In Step S10, the CPU 1 creates an MDN or DSN return mail for the mail receipt acknowledgement and attaches the whole received image information to the third part 21d (FIG. 4) or the third part 23d (FIG. 6), respectively. Then, the process proceeds to Step S6. The CPU 1 completes the creation of the MDN or DSN return mail in Step S6 and transmits the MDN or DSN return mail to the mail sender in Step S7. The process then ends. If the received mail does not include a mail receipt acknowledgement request using the MDN or the DSN and the check result of Step S9 is NO, the process ends.

Figure 8:
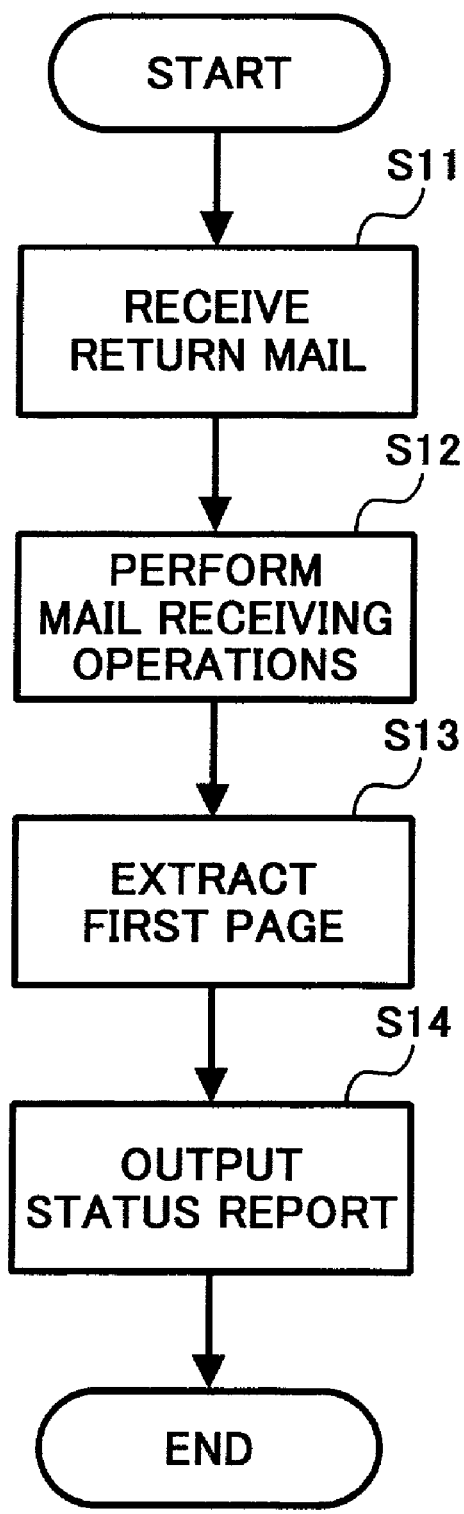
FIG. 8 is a flowchart for explaining an exemplary procedure of a return mail receiving operation performed by the data terminal of FIG. 1 located at a sender site.

Referring to FIG. 8, a description is made below for an exemplary procedure of an operation performed by the data terminal 100 at the mail sender site when it receives a return mail for a mail receipt acknowledgement from the mail recipient site. When in Step S11 of FIG. 8 the data terminal 100 at the mail sender site receives a return mail for a mail receipt acknowledgement from the mail recipient, the CPU 1 of the data terminal 100 at the mail sender site performs predetermined operations for a mail receiving event, in Step S12. Then, the CPU 1 extracts the first page from the attached image information and embeds the extracted first page and information of other field included in the return mail into a status report, in Step S13. After that, the CPU 1 outputs the status report in Step S14. Then, the process ends.

The disclosure of this patent specification may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The present disclosure may also be implemented by the preparation of application specific integrated circuits or by interconnecting an appropriate network of conventional component circuits, as will be readily apparent to those skilled in the art. While the discussion above has referred to the example of electronic messages, it should be clear that the disclosure applies to sending and receiving messages through networks that may rely in part or in whole on other technologies, such as optical signals transmission and wireless transmission, and that the example of electronic sending and receiving devices is not limiting to electronic technology but applies to implementations that in part or in tote use other technologies such as, without limitation, optical technology.

Numerous additional modifications and variations are possible in light of the above teachings. It is therefore to be understood that within the scope of the appended claims, the disclosure of this patent specification may be practiced otherwise than as specifically described herein.

This application is based on Japanese patent application, No. JPAP2001-015278 filed on Jan. 24, 2001, in the Japanese Patent Office, the entire contents of which are incorporated by reference herein.

What is claimed is:

1. A method of image communications with E-mail, comprising the steps of:
   receiving E-mail that includes image and a request for a receipt acknowledgement, said E-mail being sent from a mail sender;
   decoding said image included in said E-mail;
   creating a return mail for acknowledging a receipt of said electronic mail, wherein said return mail includes information indicating successful or unsuccessful transmission of said E-mail;
   attaching a predetermined page of said image to said return mail if the transmission of the E-mail is successful, and attaching the original E-mail in its entirety to the return mail if the transmission of the E-mail is unsuccessful, wherein said predetermined page of said image attached to said return mail corresponds to a designated page, a page number of said designated page being designated by said request included in said E-mail; and
   transmitting said return mail back to said mail sender as a response to said request.

2. The method as defined in claim 1, wherein said predetermined page is a first page of said image information included in said received E-mail.

3. The method as defined in claim 1, wherein said attaching step attaches said E-mail as it is to said return mail when said decoding step cannot decode said image information.

4. The method as defined in claim 1, wherein said request included in said E-mail requests a message disposition notification, said receiving step receives said E-mail according to a POP3 or an IMAP4 procedure, and said transmitting step transmits said return mail according to an SMTP procedure.

5. The method as defined in claim 1, wherein said request included in said E-mail requests a delivery status notification, said receiving step receives said E-mail according to an SMTP procedure, and said transmitting step transmits said return mail according to an SMTP procedure.

6. The method as defined in claim 1, further comprising a step of embedding a page number of said predetermined page into a first part of said return mail.

7. The method as defined in claim 1, further comprising a step of embedding a page number of said predetermined page into a second part of said return mail.

8. The method as defined in claim 1, wherein said predetermined page of said image information attached to said return mail corresponds to a designated page, a page number of said designated page being designated by said mail sender through an SMTP procedure for said E-mail.

9. A method of image communications with E-mail, comprising the steps of:
   transmitting E-mail to a mail recipient, said E-mail including image and a request for a receipt acknowledgement;
   receiving a return mail from said mail recipient for acknowledging a receipt of said E-mail, wherein said return mail includes information indicating successful or unsuccessful transmission of said E-mail, and said return mail including a predetermined page of said image included in said E-mail if the transmission of the E-mail is successful, or including the original E-mail in its entirety if the transmission of the E-mail is unsuccessful; and
   outputting a status report indicating contents of said return mail and including an image of said predetermined page included in said image,
   wherein said predetermined page if said image attached to said return mail corresponds to a designated page, a page number of said designated page being designated by said request included in said E-mail.

10. The method as defined in claim 9, wherein said predetermined page is a first page of said image information included in said E-mail.

11. The method as defined in claim 9, wherein said return mail received by said receiving step includes said image information included in said E-mail without being decoded when said image information cannot be decoded by said mail recipient.

12. The method as defined in claim 9, wherein said request included in said E-mail requests a message disposition notification, said transmitting step transmits said E-mail according to an SMTP procedure, and said receiving step receives said return mail according to a POP3 or an IMAP4 procedure.

13. The method as defined in claim 9, wherein said request included in said E-mail requests a delivery status notification, said transmitting step transmits said E-mail according to an SMTP procedure, and said receiving step receives said return mail according to an SMTP procedure.

14. The method as defined in claim 9, wherein a first part of said return mail received by said receiving step is embedded with a page number of said predetermined page attached to said return mail.

15. The method as defined in claim 9, wherein a second part of said return mail received by said receiving step is embedded with a page number of said predetermined page attached to said return mail.

16. The method as defined in claim 9, further comprising a step for designating a page number of a page to be attached to said return mail through an SMTP procedure for said E-mail, wherein said predetermined page of said image information attached to said return mail accordingly corresponds to said page number of the page designated by said designating step.

17. A data terminal coupled to at least a local area network, comprising:
   a communications mechanism arranged and configured to receive E-mail that includes image and a request for a receipt acknowledgement, said E-mail being sent from a mail sender through said local area network;
   a decoder decoding said image included in said E-mail; and
   a controller arranged and configured to create a return mail for acknowledging a receipt of said electronic mail, to include information in said return mail indicating successful or unsuccessful transmission of said E-mail, to attach a predetermined page of said image to said return mail if the transmission of the E-mail is successful, and attach the original E-mail in its entirety to the return mail if the transmission of the E-mail is unsuccessful, and to cause said communications mechanism to transmit said return mail back to said mail sender as a response to said request,
   wherein said predetermined page of said image attached to said return mail corresponds to a designated page, a page number of said designated page being designated by said request included in said E-mail.

18. The data terminal as defined in claim 17, wherein said predetermined page is a first page of said image information included in said received E-mail.

19. The data terminal as defined in claim 17, wherein said controller attaches said E-mail as it is to said return mail when said decoder cannot decode said image information.

20. The data terminal as defined in claim 17, wherein said request included in said E-mail requests a message disposition notification, said communications mechanism receives said E-mail according to a POP3 or an IMAP4 procedure, and said controller causes said communications mechanism to transmit said return mail according to an SMTP procedure.

21. The data terminal as defined in claim 17, wherein said request included in said E-mail requests a delivery status notification, said communications mechanism receives said E-mail according to an SMTP procedure, and said controller causes said communications mechanism to transmit said return,mail according to an SMTP procedure.

22. The data terminal as defined in claim 17, wherein said controller embeds a page number of said predetermined page into a first part of said return mail.

23. The data terminal as defined in claim 17, wherein said controller embeds a page number of said predetermined page into a second part of said return mail.

24. The data terminal as defined in claim 17, wherein said predetermined page of said image information attached to said return mail corresponds to a designated page, a page number of said designated page being designated by said mail sender through an SMTP procedure for said E-mail.

25. A data terminal coupled to a local area network, comprising:
   a communications mechanism arranged and configured to transmit E-mail to a mail recipient and to receive a return mail from said mail recipient for acknowledging a receipt of said E-mail, said E-mail including image and including a request for a receipt acknowledgement, said return mail including information indicating successful or unsuccessful transmission of said E-mail, and said return mail including a predetermined page of said image included in said E-mail, if the transmission of the E-mail is successful, and including the original E-mail in its entirety if the transmission of the E-mail is unsuccessful;
   an outputting mechanism arranged and configured to output information; and a controller arranged and configured to create said E-mail, and to retrieve said predetermined page and to cause said outputting mechanism to output a status report indicating contents of said return mail and an image of said retrieved predetermined page when said communications mechanism receives said return mail, wherein said predetermined page of said image attached to said return mail corresponds to a designated page, a page number of said designated page being designated by said request included in said E-mail.

26. The data terminal as defined in claim 25, wherein said predetermined page is a first page of said image information included in said E-mail.

27. The data terminal as defined in claim 25, wherein said return mail includes said image information included in said E-mail without being decoded when said image information cannot be decoded by said mail recipient.

28. The data terminal as defined in claim 25, wherein said request included in said E-mail requests a message disposition notification, and said communications mechanism transmits said E-mail according to an SMTP procedure and receives said return mail according to a POP3 or an IMAP4 procedure.

29. The data terminal as defined in claim 25, wherein said request included in said E-mail requests a delivery status notification, and said communications mechanism transmits said E-mail according to an SMTP procedure and receives said return mail according to an SMTP procedure.

30. The data terminal as defined in claim 25, wherein a first part of said return mail received by said communications mechanism is embedded with a page number of said predetermined page attached to said return mail.

31. The data terminal as defined in claim 25, wherein a second part of said return mail received by said communications mechanism is embedded with a page number of said predetermined page attached to said return mail.

32. The data terminal as defined in claim 25, wherein when said controller creates said E-mail said controller designates a page number of a page to be attached to said return mail through an SMTP procedure for said E-mail, wherein said predetermined page of said image information attached to said return mail accordingly corresponds to said page number of the page designated by said controller.

33. A data terminal coupled to at least a local area network, comprising:
communicating means for receiving E-mail that includes image and a request for a receipt acknowledgement, said E-mail being sent from a mail sender through said local area network;
decoding means for decoding said image included in said E-mail; and
controlling means for creating a return mail for acknowledging a receipt of said electronic mail, including information in said return mail indicating successful or unsuccessful transmission of said E-mail, attaching a predetermined page of said image to said return mail if the transmission of the E-mail is successful, and attaching the original E-mail in its entirety to said return mail if the transmission of the E-mail is unsuccessful, and causing said communicating means to transmit said return mail back to said mail sender as a response to said request,
wherein said predetermined page of said image attached to said return mail corresponds to a designated page, a page number of said designated page being designated by said request included in said E-mail.

34. The data terminal as defined in claim 33, wherein said predetermined page is a first page of said image information included in said received E-mail.

35. The data terminal as defined in claim 33, wherein said controlling means attaches said E-mail as it is to said return mail when said decoding means cannot decode said image information.

36. The data terminal as defined in claim 33, wherein said request included in said E-mail requests a message disposition notification, said communicating means receives said E-mail according to a POP3 or an IMAP4 procedure, and said controlling means causes said communicating means to transmit said return mail according to an SMTP procedure.

37. The data terminal as defined in claim 33, wherein said request included in said E-mail requests a delivery status notification, said communicating means receives said E-mail according to an SMTP procedure, and said controlling means causes said communicating means to transmit said return mail according to an SMTP procedure.

38. The data terminal as defined in claim 33, wherein said controlling means embeds a page number of said predetermined page into a first part of said return mail.

39. The data terminal as defined in claim 33, wherein said controlling means embeds a page number of said predetermined page into a second part of said return mail.

40. The data terminal as defined in claim 33, wherein said predetermined page of said image information attached to said return mail corresponds to a designated page, a page number of said designated page being designated by said mail sender through an SMTP procedure for said E-mail.

41. A data terminal coupled to a local area network, comprising:
communicating means for transmitting E-mail to a mail recipient and receiving a return mail from said mail recipient for acknowledging a receipt of said E-mail, said E-mail including image and a request for a receipt acknowledgement, and said return mail including information indicating successful or unsuccessful transmission of said E-mail, and including a predetermined page of said image included in said E-mail, if the transmission of the E-mail is successful, and including the original E-mail in its entirety if the transmission of the E-mail is unsuccessful;
outputting means for outputting information; and
controlling means for creating said E-mail, and when said communicating means receives said return mail, said controlling means being arranged and configured to retrieve said predetermined page and to cause said outputting means to output a status report indicating contents of said return mail and an image of said retrieved predetermined page,
wherein said predetermined page of said image attached to said return mail corresponds to a designated page, a page number of said designated page being designated by said request included in said E-mail.

42. The data terminal as defined in claim 41, wherein said predetermined page is a first page of said image information included in said E-mail.

43. The data terminal as defined in claim 41, wherein said return mail includes said image information included in said E-mail without being decoded when said image information cannot be decoded by said mail recipient.

44. The data terminal as defined in claim 41, wherein said request included in said E-mail requests a message disposition notification, and said communicating means transmits said E-mail according to an SMTP procedure and receives said return mail according to a POP3 or an IMAP4 procedure.

45. The data terminal as defined in claim 41, wherein said request included in said E-mail requests a delivery status notification, and said communicating means transmits said E-mail according to an SMTP procedure and receives said return mail according to an SMTP procedure.

46. The data terminal as defined in claim 41, wherein a first part of said return mail received by said communicating means is embedded with a page number of said predetermined page attached to said return mail.

47. The data terminal as defined in claim 41, wherein a second part of said return mail received by said communicating means is embedded with a page number of said predetermined page attached to said return mail.

48. The data terminal as defined in claim 41, wherein when said controlling means creates said E-mail said controlling means designates a page number of a page to be attached to said return mail through an SMTP procedure for said E-mail, wherein said predetermined page of said image information attached to said return mail accordingly corresponds to said page number of the page designated by said controlling means.

49. An e-mail system comprising:
a sending facility coupled with a communications network to which a number of receiving facilities are also coupled;
said sending facility being configured to assemble an e-mail message that includes non-image information including a request for an acknowledgment, and image, and to transmit the assembled e-mail message to a selected one of said receiving facilities;
said sending facility being further configured to receive a response e-mail message from said selected receiving facility, said response e-mail message including both non-image information and image, said response e-mail message including information indicating successful or unsuccessful transmission of said original e-mail, and including a predetermined page of said image included in said original e-mail, if the transmission of the original e-mail is successful, and including the original e-mail in its entirety if the transmission of the original e-mail is unsuccessful; and
an output system coupled to said sending facility and responsive to said response e-mail message to automatically assemble and provide a visual output of a status report related to said response e-mail message, said visual output corresponding to at least a part of the image included in the response e-mail message,
wherein said predetermined page of said image attached to said return mail corresponds to a designated page, a page number of said designated page being designate by said request included in said E-mail.

50. An e-mail system comprising:
a receiving facility coupled with a communications network to which a sending facility is also coupled;
said receiving facility being configured to receive an incoming e-mail message over said network from said sending facility, said received e-mail message including a request for an acknowledgment and both non-image information and image;
said receiving facility being further configured to automatically assemble a response e-mail message that includes both non-image information and image, said response e-mail message including information indicating successful or unsuccessful transmission of said received e-mail message, and including a predetermined page of said image included in said received e-mail message, if the transmission of the received e-mail message is successful, and including the received e-mail message in its entirety if the transmission of the received e-mail message is unsuccessful; and
an output system coupled to said receiving facility and configured to automatically send said response e-mail message to said sending facility over said network,
wherein said predetermined page of said image attached to said return mail corresponds to a designated page, a page number of said designated page being designated by said request included in said E-mail.

51. The e-mail system as in claim 50 in which said receiving facility includes a decoding system configured to decode said image information included in the incoming message and to include in said response e-mail message only image information corresponding to a selected page of the image information.

52. The e-mail system as in claim 50 in which said receiving facility includes a decoding system configured to attempt to decode said image information included in said incoming message and, in case of a failure to decode, to include in said response e-mail image information corresponding to all of the image information received at said receiving facility.

53. The method of claim 1, wherein the return mail includes (a) a comment part indicating a page number of the predetermined page attached to said return mail, and (b) an additional part including the attachment of the original E-mail in its entirety.

54. The method of claim 53, wherein said predetermined page is a first page of said received E-mail.

55. The method of claim 9, wherein the return mail includes (a) a comment part indicating a page number of the predetermined page attached to said return mail, and (b) an additional part including the attachment of the original E-mail in its entirety.

56. The method of claim 55, wherein said predetermined page is a first page of said E-mail.

57. The data terminal of claim 17, wherein the return mail includes (a) a comment part indicating a page number of the predetermined page attached to said return mail, and (b) an additional part including the attachment of the original E-mail in its entirety.

58. The data terminal of claim 57, wherein said predetermined page is a first page of said E-mail.

59. The data terminal of claim 25, wherein the return mail includes (a) a comment part indicating a page number of the predetermined page attached to said return mail, and (b) an additional part including the attachment of the original E-mail in its entirety.

60. The data terminal of claim 59, wherein said predetermined page is a first page of said E-mail.

61. The data terminal of claim 33, wherein the return mail includes (a) a comment part indicating a page number of the predetermined page attached to said return mail, and (b) an additional part including the attachment of the original E-mail in its entirety.

62. The data terminal of claim 61, wherein said predetermined page is a first page of said E-mail.

63. The data terminal of claim 41, wherein the return mail includes (a) a comment part indicating a page number of the predetermined page attached to said return mail, and (b) an additional part including the attachment of the original E-mail in its entirety.

64. The data terminal of claim 63, wherein said predetermined page is a first page of said E-mail.

65. The e-mail system of claim 49, wherein the response e-mail message includes (a) a comment part indicating a page number of the predetermined page attached to said return mail, and (b) an additional part including the attachment of the original E-mail in its entirety.

66. The data terminal of claim 65, wherein said predetermined page is a first page of said E-mail.

67. The e-mail system of claim 50, wherein the response e-mail message includes (a) a comment part indicating a page number of the predetermined page attached to said return mail, and (b) an additional part including the attachment of the original E-mail in its entirety.

68. The data terminal of claim 67, wherein said predetermined page is a first page of said E-mail.

* * * * *